United States Patent [19]

Ohta et al.

[11] Patent Number: 5,737,150
[45] Date of Patent: Apr. 7, 1998

[54] MAGNETIC DISK UNIT WITH AN IMPACT FORCE APPLYING MECHANISM

[75] Inventors: Hiroaki Ohta, Hiratsuka; Yusuke Miyamoto; Koji Kodama, both of Odawara; Atsushi Ito, Ashigarakami-gun; Hiroshi Nishida, Naka-gun; Tomoyuki Ohno, Hiratsuka; Kojiro Hayashi, Odawara, all of Japan

[73] Assignee: Hitachi, Ltd., Tokyo, Japan

[21] Appl. No.: 661,543

[22] Filed: Jun. 11, 1996

[30] Foreign Application Priority Data

Jun. 14, 1995 [JP] Japan ................ 7-147078

[51] Int. Cl.⁶ ................................ G11B 21/22
[52] U.S. Cl. ................ 360/103; 360/75; 360/97.01
[58] Field of Search .............. 360/75, 97.01–98.01, 360/103–106, 125, 126, 137

[56] References Cited

U.S. PATENT DOCUMENTS

| | | | |
|---|---|---|---|
| 4,542,429 | 9/1985 | Nishida et al. | 360/103 |
| 4,897,743 | 1/1990 | Kohno | 360/75 |
| 4,933,785 | 6/1990 | Morehouse et al. | 360/78.04 |
| 4,970,610 | 11/1990 | Knappe | 360/75 |
| 5,018,029 | 5/1991 | Ekhoff et al. | 360/75 |
| 5,084,793 | 1/1992 | Ishida et al. | 360/75 |
| 5,313,352 | 5/1994 | Chikazawa et al. | 360/103 |
| 5,384,675 | 1/1995 | Crawforth et al. | 360/75 |

FOREIGN PATENT DOCUMENTS

| | | | |
|---|---|---|---|
| 54-23508 | 2/1979 | Japan . | |
| 54-84712 | 7/1979 | Japan . | |
| 55-108964 | 8/1980 | Japan . | |
| 58-2176 | 2/1983 | Japan | 360/75 |
| 61-117722 | 6/1986 | Japan | 360/75 |
| 61-187179 | 8/1986 | Japan | 360/75 |
| 63-58687 | 3/1988 | Japan | 360/75 |
| 1-134770 | 5/1989 | Japan . | |
| 1-205757 | 8/1989 | Japan | 360/75 |
| 2-81379 | 3/1990 | Japan | 360/75 |
| 2-139776 | 5/1990 | Japan | 360/75 |
| 6-203514 | 7/1994 | Japan . | |

*Primary Examiner*—Jefferson Evans
*Attorney, Agent, or Firm*—Fay, Sharpe, Beall, Fagan, Minnich & McKee

[57] ABSTRACT

A magnetic disk unit has a magnetic head-disk stickiness eliminating mechanism suitable for a small-sized, low power consumption type magnetic disk unit of a high recording density. The magnetic disk unit has a housing in which is enclosed a magnetic disk medium made of glass, a spindle and a spindle motor for driving the magnetic medium in rotation, a slider for supporting a magnetic head and an actuator for positioning the magnetic head. An impact force applying mechanism mounted adjacent the housing applies an impact force to the housing for manually imposing a predetermined certain impact force on the housing. By applying an impact force manually to the housing before use of the magnetic disk unit or when the disk unit becomes inoperative due to sticking, it is possible to easily eliminate the sticking phenomenon between the magnetic head and the magnetic disk medium, thus permitting operation of the magnetic disk unit.

18 Claims, 5 Drawing Sheets

MAGNETIC DISK UNIT WITH AN IMPACT FORCE APPLYING MECHANISM

BACKGROUND OF THE INVENTION

1. Field of the Invention

The present invention relates to a magnetic disk unit small in size and low in power consumption. Particularly, the invention is concerned with a magnetic disk unit, such as a hard disk drive, having a mechanism for overcoming a sticking phenomenon that occurs between a magnetic head and a magnetic disk.

2. Description of the Related Art

Computers are becoming smaller and smaller in size At first they were desk-top size, then lap-top size, further, notebook size and even memo-book size. More particularly, coupled with the progress in attaining a higher recording density, the reduction in size of magnetic disk units available on the market has continued from the 3.5 inch size to the 2.5 and 1.8 inch sizes, and further to the 1.3 inch size in terms of the diameter of the magnetic disk medium. In the case of magnetic disk units mounted fixedly or removably within portable computers not larger than the notebook size, they are now mostly not larger than 2.5 inches in disk diameter.

With the reduction in size of magnetic disk units, card-shaped, detachable type, magnetic disk units have become popular. As specifications for the standardization of such card type magnetic disk units and other electronic devices, including mechanical attachment and detachment, as well as electrical connection (interface), there are standard specifications of IC memory cards for personal computers. These specifications have been developed in cooperation with the Japan Electronic industry Development Association (JEIDA) and the Personal Computer Memory Card international Association (PCMCIA), U.S.A.

The standard specifications originally did not cover magnetic disk units, but later with the reduction in size of magnetic disk units, they have been extended to also cover magnetic disk units and other interfacing devices. According to the standard specifications of IC memory cards for personal computers, it is possible to set an operational environment so as to permit a combined use of magnetic disks with other cards present on or within a system. If the operational environment provided by a card does not satisfy the operational environment required by the system, the system can refuse the use of the card. The operational environment required by the system includes parameters relating to information about power supply conditions. These parameters include standard operation supply voltage, minimum operation supply voltage, maximum operation supply voltage, continuous supply current, maximum value of average current in one second, maximum value of average current in 10 milliseconds, and supply current necessary in a power-down mode.

Thus, small-sized magnetic disk units such as card type magnetic disk units are expected to be used more and more, mainly in portable information-related devices with batteries incorporated therein. As a result, these devices are required to be low in power consumption.

According to a typical conventional method for reducing the power consumption, as shown in U.S. Pat. No. 4,933,785 (Japanese Patent Laid Open No. Hei 3-503101, the corresponding international patent application), the operation mode is divided into several operation modes such as, for example:

(1) a sleep mode wherein the circuit functions are stopped other than the minimum interfacing function to a host system necessary for restart-up;

(2) an idle mode wherein a spindle motor is rotating, a partial servo function is in operation, and a data recording/reproducing circuit is off; and (3) a normal operation mode permitting write, read, and seek.

In each of those operation modes, power consumption is suppressed in the circuits corresponding to unnecessary functions. This conventional method is effective in diminishing the power consumption in the state of average use. But equally important is the reduction of power consumption in discrete circuit components, including the spindle motor. To this end, for spindle motors to rotate magnetic disk mediums in small-sized magnetic disk units, there is now a tendency to restrict the maximum current and reduce the size and thickness of the motors themselves, thereby diminishing the starting torque. This is also true of the rotary voice coil motor for driving the magnetic head actuator.

In view of these reductions in size and starting torque power, there is concern for the sticking phenomenon which occurs between a magnetic head and a magnetic disk medium. For a magnetic disk unit of a contact start-stop type, the rotation of a magnetic disk medium is started with a magnetic head slider pressed against the disk surface i.e. in the contact/stop state. As the magnetic disk medium rotates, the magnetic head slider slides in contact with the surface of the magnetic disk medium until the circumferential speed of the magnetic disk medium reaches a predetermined level at which the slider floats over the disk surface under a dynamic pressure. Thereafter, by virtue of the dynamic pressure, the slider keeps its floating state over the magnetic disk surface.

For improving the abrasion resistance of the magnetic head slider and the magnetic disk surface there is used a surface lubricant which covers the surface of the magnetic disk. Such a surface lubricant is used also in a contact type magnetic disk unit wherein a magnetic head or a magnetic head slider remains in contact with a magnetic medium during read and write. The magnetic head contact type magnetic disk unit can achieve a higher recording density than the magnetic head floating type magnetic disk unit.

However, in the case where a magnetic head slider and a magnetic disk medium, which are both extremely flat, are held in contact with each other for a long time, though there is a surface lubricant, there often occurs a sticking phenomenon. The sticking phenomenon is an obstacle to start-up of the magnetic disk unit. In view of this point, various considerations and improvements have so far been made for making the sticking phenomenon difficult to occur or for eliminating the state of sticking.

One method that substantially prevents the occurrence of such sticking phenomenon is known as a ramp loading technique as disclosed, for example, in Japanese Patent Laid Open No. Hei 1-134770 and Japanese Patent Laid Open No. Hei 3-503101 (corresponding U.S. Pat. No. 4,933,785). According to this technique, a magnetic head suspension structure is held by a tapered holder member mounted above a magnetic disk medium, to hold the magnetic head slider without contact with the surface of the magnetic disk medium. However, it is necessary to provide such a holding member as an additional component(s) and ensure the holding spacing for the magnetic disk.

Another method that addresses the sticking phenomenon is disclosed in Japanese Patent Publication No. Sho 57-8530 (Laid Open No. Sho 54-23508). According to this conventional method, in a magnetic disk unit of a magnetic head contact type, a contact start-stop zone (a zone wherein a magnetic head slider comes into contact with a magnetic disk medium when the rotation of the disk medium is stopped) is formed on the surface of the disk medium. In this zone, the disk medium surface is roughened to lower the flatness thereof. This technique is a zone texture technique. The effect of this technique is achieved at a trade-off with respect to improvement of abrasion resistance. Complete prevention of sticking is difficult, and the production cost increases.

Making various improvements to the characteristics of the surface lubricant has also been proposed. With this method alone, however, it is difficult to completely prevent the sticking phenomenon.

In Japanese Patent Laid Open No. Hei 6-203514, there is disclosed a method wherein projections are formed on a magnetic head slider to reduce the area of contact thereof with a magnetic disk medium, thereby diminishing static friction between the slider and the disk medium. In this case, however, it is necessary to give consideration so as to avoid a physical damage caused by the sliding contact between the magnetic head slider and the magnetic disk medium through the projections formed on the slider.

A still further method so far proposed for eliminating the sticking phenomenon utilizes a starting power induced by a magnetic disk spindle motor or a rotary voice coil motor which is for driving a magnetic head actuator. For example, Japanese Patent Publication No. Sho 57-60707 (Laid Open No. Sho 54-84712) and U.S. Pat. No. 4,542,429 disclose a method wherein a magnetic head slider is moved radially of a magnetic disk medium just before the start of rotation of a magnetic disk to eliminate the sticking phenomenon.

Japanese Patent Publication No. Sho 61-61191 (Laid Open No. Sho 55-108964) discloses a method wherein at the time of start of rotation of a magnetic disk, a magnetic head slider is oscillated by means of a voice coil motor which is for driving a magnetic head actuator, to eliminate the sticking phenomenon.

Japanese patent application No. Sho 61-211230 (the corresponding U.S. Pat. No. 4,897,743) discloses a method wherein, before a magnetic disk starts rotating, a magnetic head actuator is pressed against an elastic stopper by means of an actuator motor, allowing a magnetic head slider to move slightly in the radial direction of the disk, to eliminate the sticking phenomenon.

However, in a small-sized magnetic disk unit of a low power consumption type with a small starting torque of a magnetic disk spindle motor and that of a rotary voice coil motor for driving a magnetic head actuator, the above prior art methods relating to the elimination of the sticking phenomenon do not afford a sufficient stickiness eliminating power.

As a further method for the elimination of stickiness, Japanese Patent Laid Open No. Hei 6-208771 (corresponding U.S. Pat. No. 5,313,352) discloses a method wherein a plurality of oscillator elements are provided in the portions of a magnetic head slider and the slider is thereby oscillated in a predetermined oscillation mode to eliminate stickiness. According to this method, however, the magnetic head slider portion is complicated, thus resulting in an increase in the production cost.

SUMMARY OF THE INVENTION

It is an object of the present invention to provide a magnetic disk unit having a mechanism for eliminating stickiness occurring between a magnetic head (slider) and a magnetic disk medium which mechanism is suitable for a smallsized magnetic disk unit of a low power consumption type with a small starting torque of a spindle motor and of a rotary voice coil motor (hereinafter referred to as a "VCM") for driving a magnetic head actuator.

The above-mentioned object is attained by providing an impact force applying mechanism in a housing of a magnetic disk unit which has a magnetic disk medium such as a glass substrate or another substrate formed of a hard material. When an impact force is applied to the housing through the impact force applying mechanism, it is transmitted to the magnetic head and the magnetic disk medium, which then undergo slight displacements or oscillations to eliminate stickiness.

DETAILED DESCRIPTION OF THE PREFERRED EMBODIMENTS

The structure and operation of a magnetic disk unit will be described below briefly with reference to FIG. 1, which is a perspective view of a magnetic disk unit of a contact start-stop type ("CSS" type hereinafter). Mounted adjacent the housing of the disk unit is an impact force applying mechanism to be discussed in greater detail hereinafter.

Figure 1:
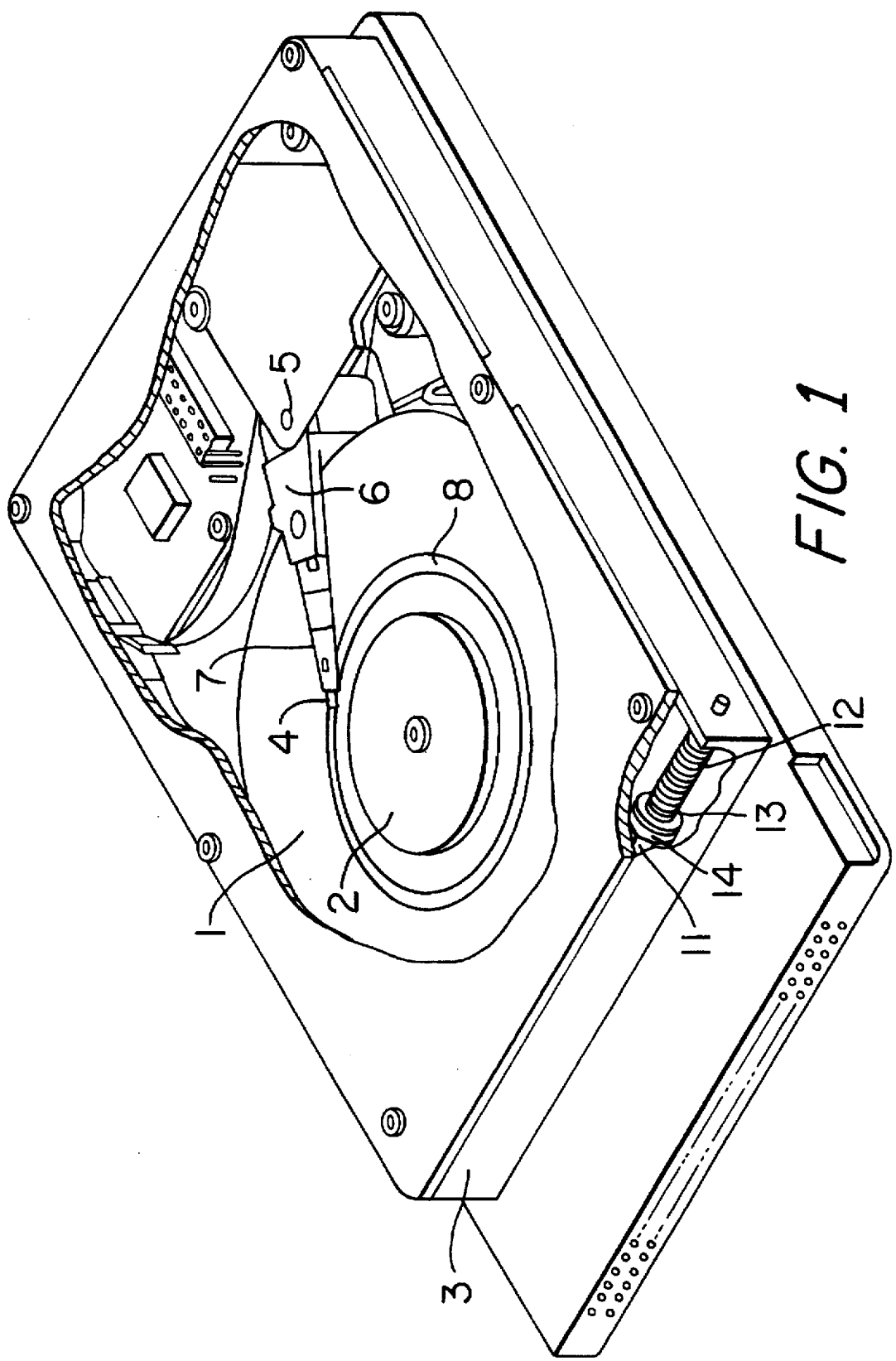
FIG. 1 is a perspective view of a magnetic disk unit of a contact start-stop type which has an impact force applying mechanism mounted adjacent the housing.

With reference to FIG. 1, a magnetic disk 1 is contained or positioned within a housing 3 and supported for rotation by a spindle motor 2. The substrate material of the magnetic disk 1 may be a hard glass, aluminum, or any other non-magnetic material. A magnetic head slider 4 is mounted within the housing 3 through pivot bearing 5, carriage 6 and gimbals 7.

In operation, the magnetic disk 1 is rotated at high speed by the spindle motor 2, while the magnetic head slider 4 assumes a floating state by the dynamic pressure of the air present within the housing, which pressure is induced by the rotation of the disk 1. The magnetic head utilizes a magnetic circuit formed between the floating magnetic head slider 4 and magnetic disk 1 to perform information recording and reproduction with respect to the disk 1.

When the magnetic disk unit is not in operation, the magnetic head slider 4 is pushed by the gimbals 7 against a CSS zone 8 formed outside the data area on the surface of the magnetic disk 1. The slider 4 is in close contact with the CSS zone 8 at rest. This state often causes a sticking phenomenon to occur between the magnetic disk 1 and the magnetic head slider 4. In this case, if the sticking force between is larger than the starting torque of the spindle motor 1 and VCM torque of the carriage 6, the magnetic disk unit will not start operating, causing an operation problem.

Figure 2:
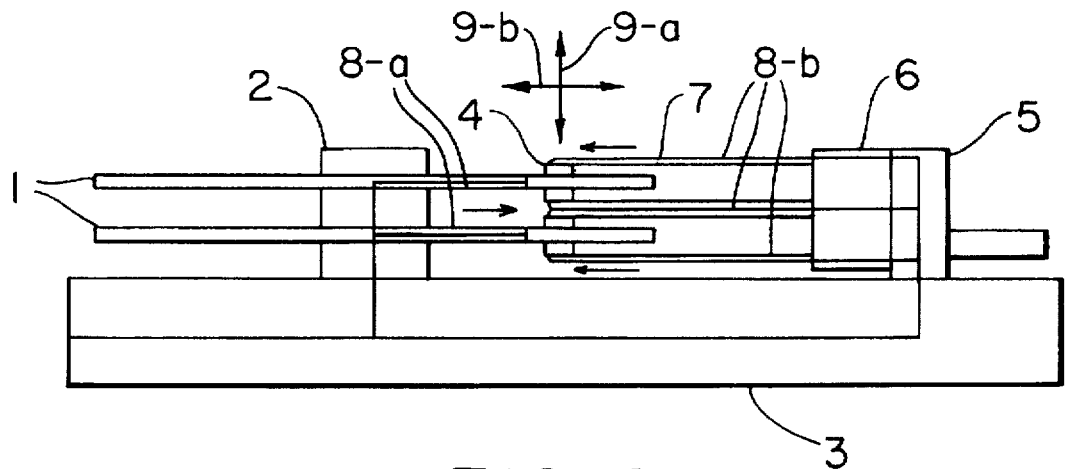
FIG. 2 is a schematic view showing the manner in which the impact force is transmitted to the slider(s) for the magnetic head and the disk(s).

The principle of overcoming the sticking phenomenon in the present invention will be described below with reference to FIG. 2, which is a schematic diagram showing the manner in which an impact force is transmitted to the magnetic head slider 4 and magnetic disk 1.

When an impact force is applied to the housing 3, the applied impact force has such components as indicated with arrows 9-a and 9-b, which are transmitted to the magnetic disk 1 and the magnetic head slider 4, respectively. The force component 9-a is perpendicular to the magnetic disk 1 and the force component 9-b is parallel to the disk 1. A combined force of the two components 9-a and 9-b, effects the contact point between the disk 1 and the magnetic head slider 4. The vertical component 9-a causes oscillation of the magnetic head slider 4, allowing it to strike the magnetic disk 1 continuously, and thus acts as a force to overcome the stickiness phenomenon. Also, the horizontal component 9-b acts in a shearing direction to overcome the stickiness, whereby the stickiness between the disk 1 and the slider 4 can be overcome or eliminated.

An embodiment of the present invention will be described below with reference to FIGS. 1 and 3.

As shown in FIG. 1, according to a first embodiment of the present invention, an impact force applying mechanism has an impact force applying portion 11, a spring 12, a core rod 13 and a collar 14 provided externally of the sealed components storage portion of the housing 3. A contact part of the impact force applying portion 11 for contact with the housing 3 is preferably formed of a spherical shape for concentrating the impact force. The spring 12, which is disposed between the collar 14 and the housing 3, is normally in a fully extended state. The core rod 13 is formed with a stepped portion so that, when pulled, it comes into abutment with the housing 3 and functions as a stopper. The housing 3 provides a guide at the two points of collar 14 and core rod 13 (by way of through holes formed in the housing, for example). When the core rod 13 is pulled by grasping end portion 13a to compress spring 12, and the core rod is thereafter released by hand, the impact force applying portion 11 can impart or give an impact to the housing 3 by virtue of the resilience of the spring 12. The generation of dust caused by the impact force applying portion 11 poses no problem because the impact force applying mechanism is disposed outside the sealed components storage portion of the housing, as shown.

Figure 3:
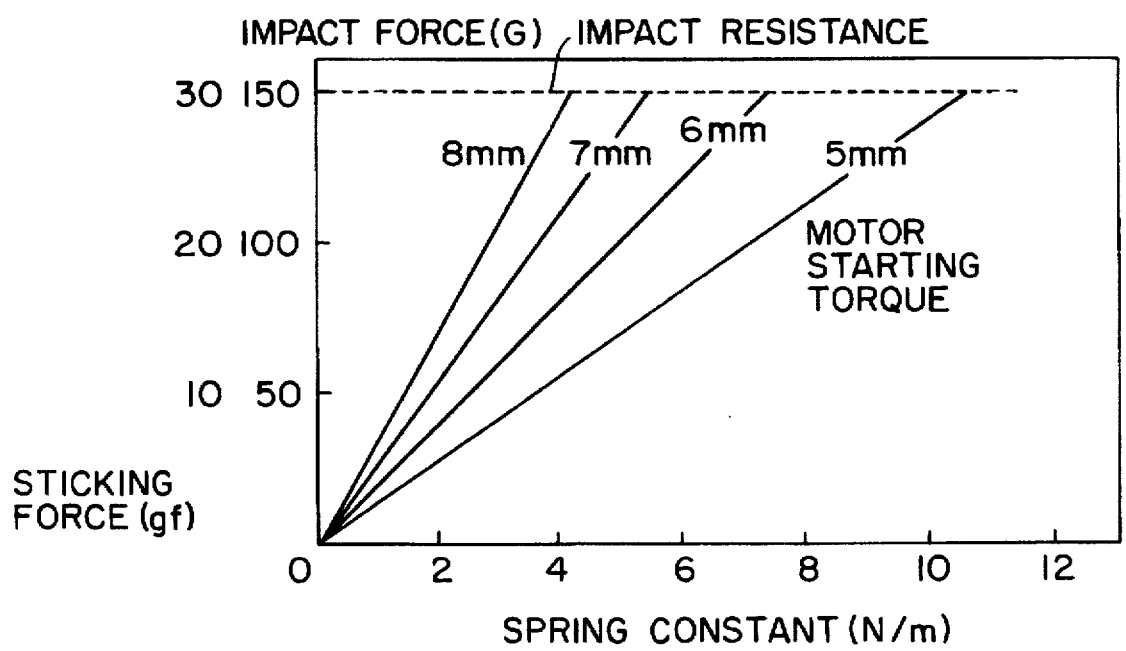
FIG. 3 is a diagram showing a relation between the spring constant of a spring used in the impact force applying mechanism and the sticking force capable of being overcome.

FIG. 3 shows the results of an actual operation performed by using the mechanism described above to overcome a stickiness phenomenon occurring between a slider and a disk. In particular, FIG. 3 is a diagram showing the relationship between the spring constant of the spring 12 used in the impact force applying mechanism and the sticking force capable of being overcome or eliminated. The magnetic disk unit used in the measurement was a 1.8 inch type magnetic disk unit (thickness: 10.5 mm) having two magnetic disk mediums and four magnetic heads. The impact force applying position and direction adopted in the 1.8 inch type magnetic disk unit are as illustrated in FIG. 1 in which there is a spatial margin. Glass, aluminum, and iron, were used as the substrate materials of the medium of magnetic disk 1, housing 3, and impact force applying portion 11, respectively. The sticking force (gf) capable of being overcome or eliminated and the corresponding impact force (G) exerted on the magnetic disk unit are plotted along the axis of the ordinate, while the spring constant (N/m) is read along the axis of the abscissa. Also shown in FIG. 3 are constants based on the assumption that the impact resistance of the disk unit is 150 G and that the starting torque of the spindle motor 2 is 15 gf.

In the case where the sticking force is not greater than 15 gf, the stickiness can be overcome by the starting torque of the spindle motor 2, and the magnetic disk unit starts operating. But if the sticking force exceeds 15 gf, the stickiness cannot be overcome by the starting torque of the spindle motor 2, and the spindle motor does not rotate. In this case, by applying an impact force in the range of 75 G to 150 G to the housing 3, the stickiness associated with the relation shown in FIG. 3 can be overcome without breakage of the magnetic disk unit and without damaging the magnetic disk medium. It thus becomes possible for the disk unit to operate.

The impact force applied depends on a movable distance (displacement of the spring), so in the magnetic disk unit subjected to the measurement, such distance should be taken as large as possible and hence the core rod 13 was formed with a stepped portion in a position corresponding to the distance of 7 mm. Taking variations into account, the spring constant was set at 5.25 N/m. Assuming that variations in the applied impact force are 10 G, it is possible to apply an impact force of at least about 130 G. Accordingly, it is possible to overcome a sticking force of 26 gf and eliminate the corresponding stickiness.

However, no limitation is made to the relation shown in FIG. 3 because this relation varies depending on the direction of impact, duration of impact, kind of the surface lubricant used, the surface condition of the magnetic disk medium, structure of the magnetic disk unit, and many other factors. Also, as to the impact resistance of the magnetic disk unit and the starting torque of the spindle motor, they are not limited to those illustrated. Theoretically, the impact resistance ought to be up to the breaking or damage causing point of the magnetic disk 1 or of the magnetic head slider 4. The material of the magnetic disk medium (substrate) is not limited to glass; it may be any other material having an impact resistance high enough to resist the continuous hitting of the magnetic head slider 4 such as, for example, ceramic, titanium element, carbon element, or a composite or alloy containing those materials as principal ingredients. The impacting position and direction are not limited to those shown above, either. If the spring constant is set small, the impact force applying mechanism is also applicable to the ordinary magnetic disk substrate medium formed principally of aluminum.

Other embodiments of the impact applying mechanism providing an impact force to the housing of the disk unit will be described below with reference to FIGS. 4, 5, 6, 7 and 8.

Figure 4:
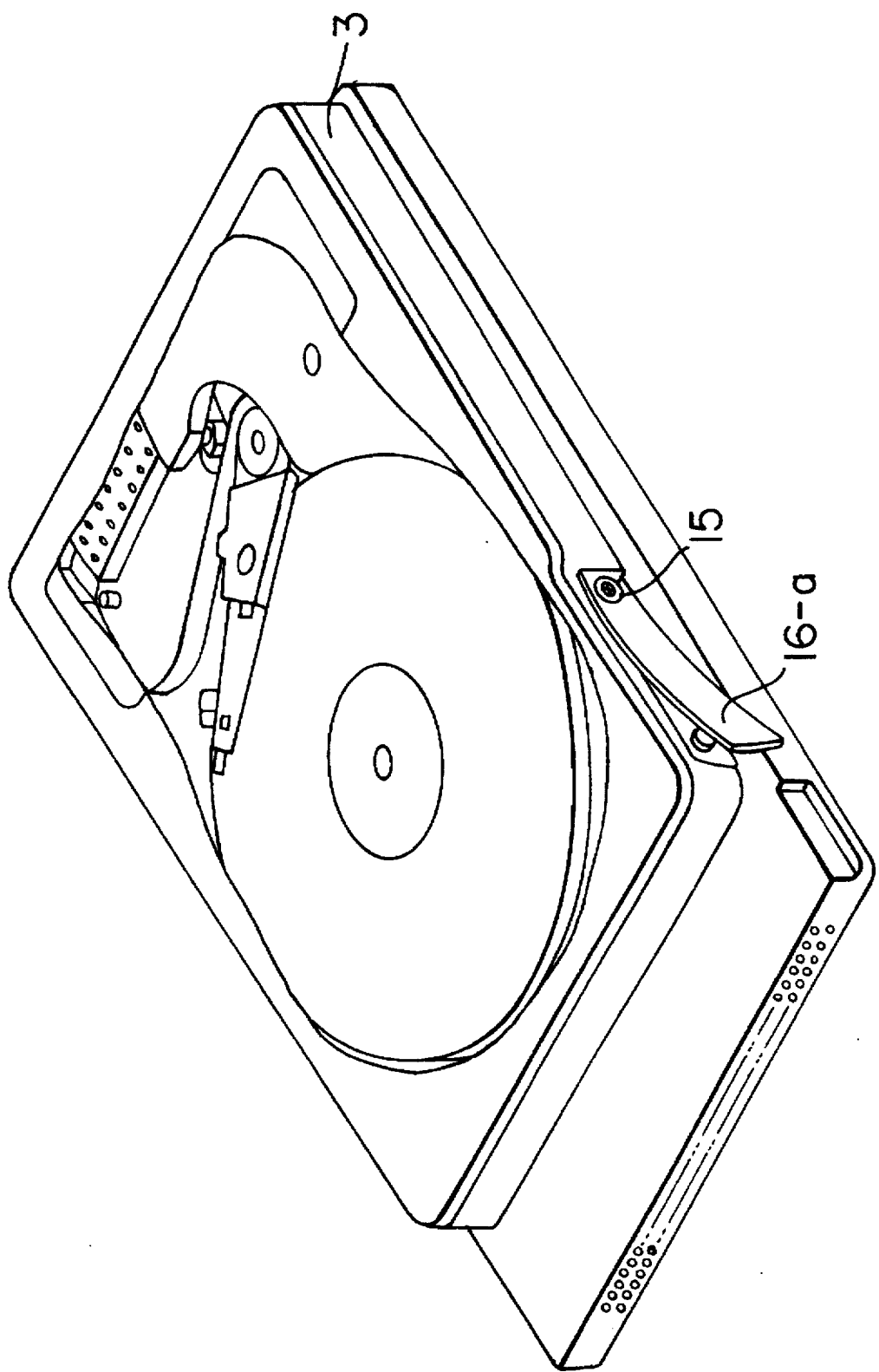
FIG. 4 is a perspective view of a magnetic disk unit which carries thereon an impact force applying mechanism utilizing an impact force imparting element formed of a resilient material.

FIG. 4 is a perspective view of a magnetic disk unit which carries thereon an impact force applying mechanism utilizing an impact force imparting element formed of a resilient material. The reference numerals of the same components as in FIG. 1 are omitted. As shown in FIG. 4, a resilient member 16-a, such as a leaf spring formed of metal or plastic, is attached with a bolt 15 to an outer portion of the housing 3. When the resilient member 16-a is manually pulled and then released, an impact force can be imparted to the housing 3. The shape of the resilient member 16-a and how to fix it are not limited to those illustrated. According to this method, an impact force can be applied to the housing 3 by means of a simple mechanism.

Figure 5:
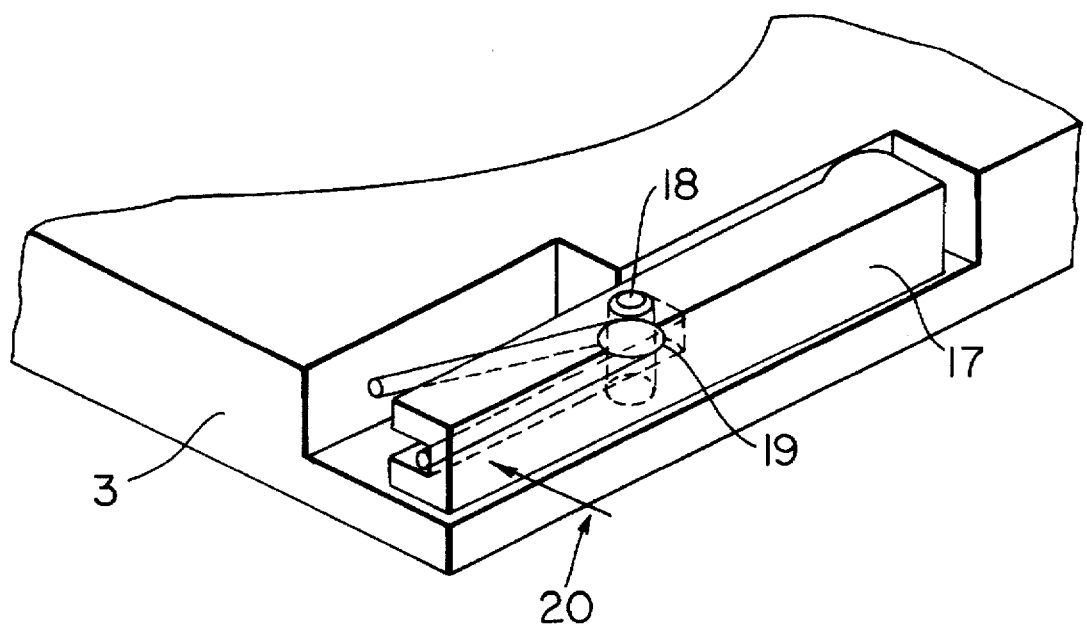
FIG. 5 is a partial diagrammatic view showing an impact force applying mechanism which utilizes a spring.

FIG. 5 shows an impact force applying mechanism according to a third embodiment of the present invention which utilizes a spring 19 for biasing a rotatable impact force applying portion or member 17. Member 17 is rotatable about a pivot 18 and is normally in contact with the housing 3 under the biasing force of the spring 19. The sticking force can be overcome by releasing the impact force applying portion 17 after manually displacing the member inwardly in the direction indicated by arrow 20. The impact force applying portion 17 returns to its original or normal position by virtue of the spring 19 with an impact force that is applied to the housing 3. It is to be understood, however, that the shape of the impact force applying portion 17, the position of the pivot 18, as well as the shape of the spring 19, and how to apply the biasing force of the spring, are not limited in the above mentioned embodiment.

According to the embodiment of the impact force applying mechanism as shown in FIG. 5, since the rotational angle of the impact force applying portion 17 can be fixed, it is possible to make constant the impact force applied and hence there is no fear of breakage of the magnetic disk unit caused by the application of excess impact thereto. Besides, the impact force to be applied can be adjusted easily by changing the rotational angle and material of the impact force applying portion 17, material of the housing 3 and the biasing force of the spring 19.

Figure 6:
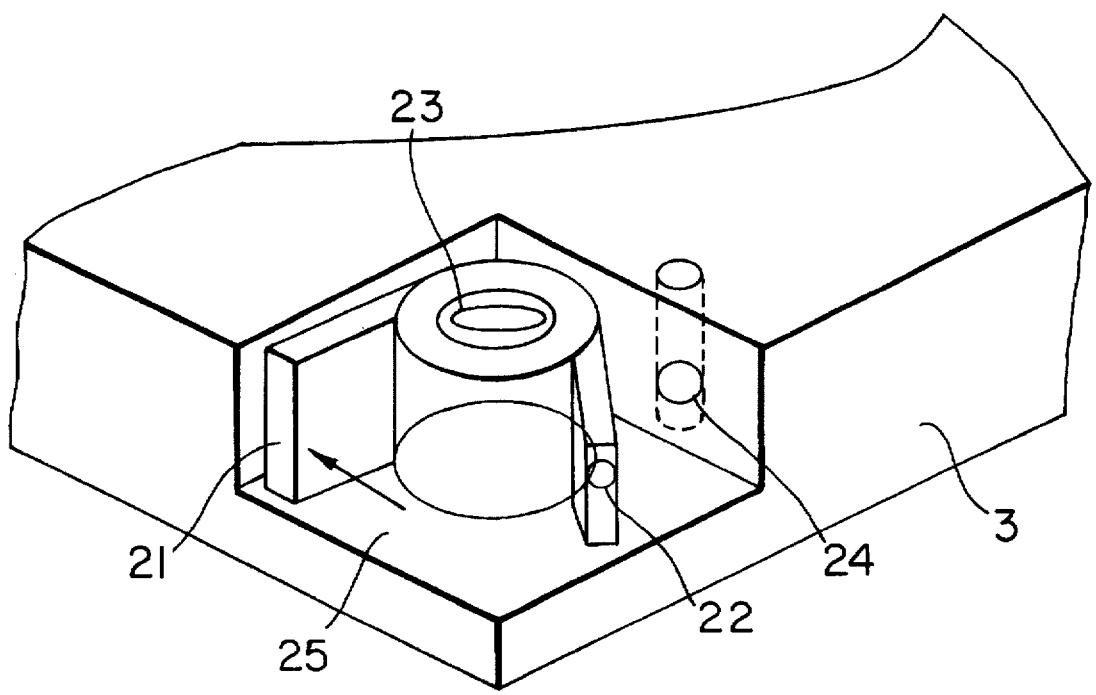
FIG. 6 is a partial diagrammatic view showing an impact force applying mechanism which utilizes a magnet.

FIG. 6 shows an impact force applying mechanism according to a fourth embodiment of the present invention which utilizes a rotatable impact force applying portion or member 21. In this impact force applying mechanism, a metal piece 22 is embedded in member 21, which portion is rotatable via a pivot 23. On the other hand, a magnet 24 is embedded in the housing 3. When the stickiness phenomenon occurs, the impact force applying portion 21 is pushed in the direction of arrow 25 and released, whereby the metal piece 22 embedded in the impact force applying portion 21 is attracted or thrust toward the magnet 24 embedded in the housing 3, thus generating an impact that is imparted on the housing 3. The shape of impact force applying portion 21, the position of the pivot 23 and the relation between the magnet 24 and the metal piece 22 are not limited to those illustrated, according to this embodiment. This mechanism is suitable for the application of a relatively small impact force and does not require a spring to be used in its construction.

Figure 7:
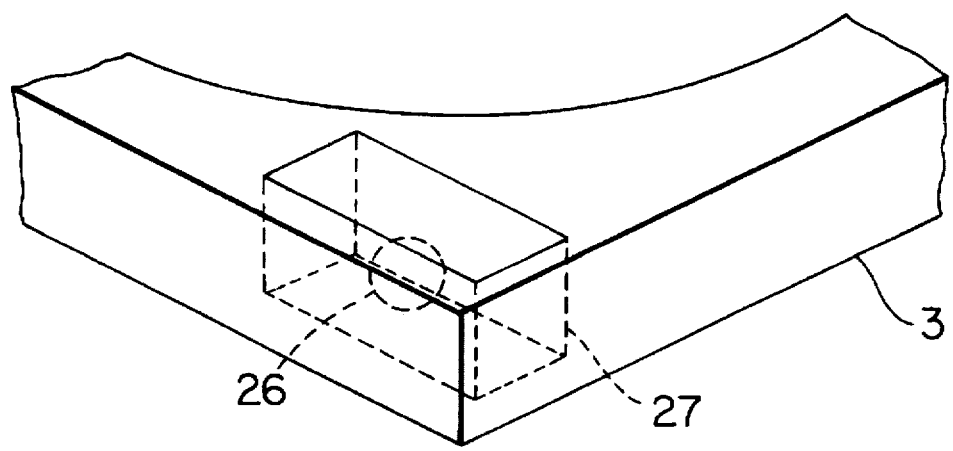
FIG. 7 is a partial diagrammatic view showing an impact force applying mechanism which utilizes a box containing a ball.
Figure 8:
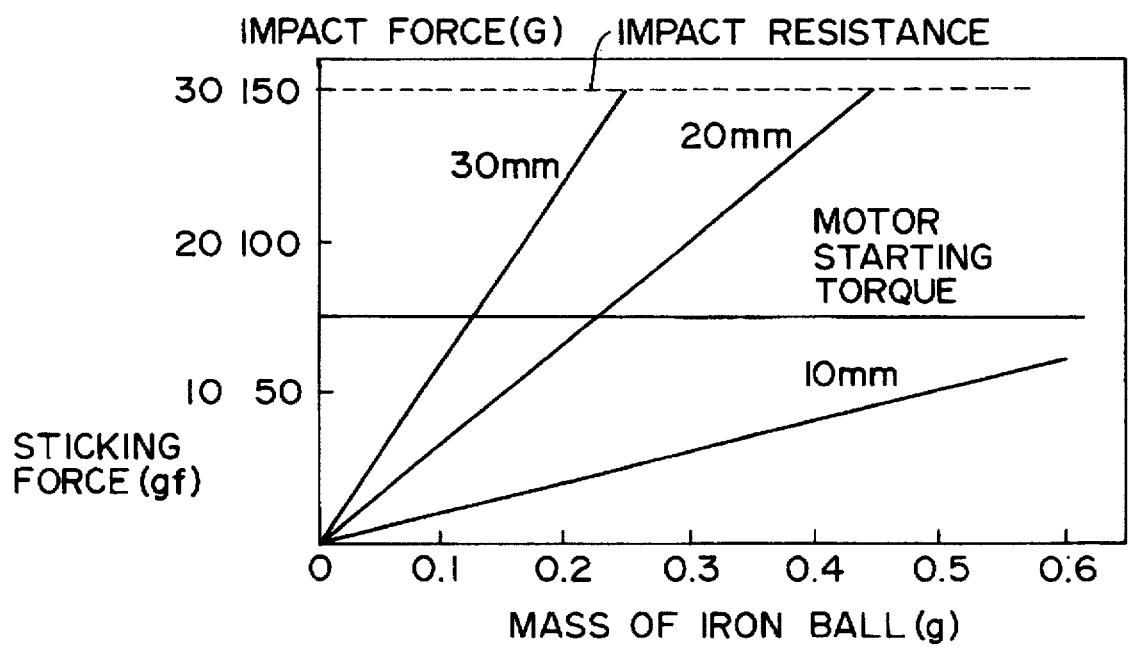
FIG. 8 is a diagram showing a relation between the mass of the ball used in the impact force applying mechanism of FIG. 7 and the sticking force capable of being overcome.

FIG. 7 illustrates an impact force applying mechanism according to a fourth embodiment of the present invention which utilizes a box containing a ball made of iron, for example, as the impact force applying mechanism. FIG. 8 illustrates a relation between the mass of the ball 26 used in the impact force applying mechanism and the sticking force capable of being overcome.

As shown in FIG. 7, a box 27 larger than the ball 26 is formed in part of the housing 3, and the ball 26 is contained in the box 27. As the housing 3 somewhat tilts, oscillates or shakes, the ball 26 rolls and strikes against the housing 3, whereby an impact force can be exerted on the housing indirectly.

FIG. 8 shows the results of an actual operation performed by using the mechanism described above to overcome a stickiness phenomenon occurring between a slider and a disk. For the operations there was used the same magnetic disk unit as that shown in FIG. 3. In FIG. 8, the sticking force (gf) capable of being overcome and the corresponding impact force (G) applied to the magnetic disk unit are plotted along the axis of the ordinate, while the axis of the abscissa represents the mass (g) of the ball 26. It is assumed that the acceleration applied is 30 m/s².

According to the impact force applying mechanism of the fourth embodiment of the present invention, it is possible to ensure a movable distance of 20 mm, and by using an iron ball of 0.4 g (the preferred embodiment) it is possible to apply an impact force of 140 G to the housing, whereby the stickiness of 28 gf in terms of strength can be overcome. But if the material and size of ball used, the shape and size of the box 27, or other conditions, are changed, the results obtained are not limited to those shown in FIG. 7.

According to this impact force applying mechanism of the fourth embodiment, upon occurrence of the sticking phenomenon, the phenomenon can be overcome by oscillating the magnetic disk unit. The mechanism is active whenever the magnetic disk unit or the associated computer body is carried from one place to another in that an impact force is periodically exerted thereon depending upon the actual shifting of the position of the device or the disk unit itself, thus preventing the occurrence of the sticking phenomenon. It is preferable that a mechanism which enables the iron ball 26 to be fixed magnetically in operation be added to the above magnetic force applying mechanism by utilizing, for example, the mounting or removing operation of the magnetic disk unit, or spindle motor or VCM.

The application of the impact force by the impact force applying mechanism according to the foregoing embodiments of the present invention is not limited to those described above. An impact or oscillation may be generated electrically, or may be applied in interlock with the insertion or removal of the magnetic disk unit with respect to the associated computer body or in conjunction with the storage case for the magnetic disk unit, which interlock may be an interlock with the storage case, PCMCIA slot of a computer or a packing container.

The CSS zone 8 may be separately provided outside the data area of the magnetic disk medium.

Further, it is preferable that the impact force applying mechanism be interlocked with the insertion or removal of the magnetic disk unit, installation thereof, unpacking, unsealing, or the storage into a storage case.

An impact force applying mechanism for imparting a slight displacement to the magnetic head, magnetic disk and other mechanical components of a magnetic disk unit is constructed according to the present invention by using members of simple structures. By slight displacement of the member(s) of the mechanism it is possible to eliminate or overcome the sticking phenomenon that occurs between the magnetic head and the disk medium. As a result, the magnetic disk unit equipped with such impact force applying mechanism can be operated smoothly.

Moreover, as the substrate material of the magnetic disk medium, there is used a hard glass or other highly rigid material, so even after the application of an impact force, there remains no damage trace on the surface of the magnetic disk medium caused by the magnetic head. Further, the generation of dust caused by the operation of the mechanism poses no problem because the mechanism is isolated hermetically from a housing that loads a magnetic disk medium.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

We claim:

1. A magnetic disk unit, comprising:
   a housing in which is enclosed:
   a magnetic disk medium;
   a spindle and a spindle motor for driving said magnetic medium in rotation;
   a magnetic head for writing and reading information with respect to said magnetic disk medium;
   a slider for supporting said magnetic head; and
   an actuator for positioning said magnetic head;
   an impact force applying mechanism that is actuated mechanically without using electric power mounted adjacent said housing that applies an impact force to said housing to overcome a sticking phenomenon between said slider and said medium; and
   an electronic circuit for controlling read and write of data with respect to said magnetic disk medium.

2. A magnetic disk unit according to claim 1, wherein said electronic circuit is enclosed in said housing.

3. A magnetic disk unit according to claim 1, wherein said impact force applying mechanism is provided within said housing and is hermetically isolated from said magnetic disk medium.

4. A magnetic disk unit according to claim 1, wherein said magnetic disk substrate is selected from one of glass, ceramic, titanium, and carbon.

5. A magnetic disk unit according to claim 1, wherein said impact force applying mechanism has a resilient member having opposite ends, one end of which is secured to the housing and the other end of which is positioned close to said housing in a normal position and impacts said housing after being displaced from said normal position.

6. A magnetic disk unit according to claim 5, wherein said one end is secured on said housing by a bolt.

7. A magnetic disk unit according to claim 1, wherein said impact force applying mechanism has means for imparting an impact force on said housing including a rotatable member having one end that contacts said housing in a normal position; and bias means for returning said one end to said normal position when displaced therefrom to impart said impact force.

8. A magnetic disk unit according to claim 1, wherein said impact force applying mechanism has a rotatable member rotatably supported about a pivot and means for biasing said rotatable member so that one side of said rotatable member contacts said housing in a normal position, whereby the one side imparts an impact force on said housing when said one side is displaced and returns to said normal position.

9. A magnetic disk unit according to claim 1, wherein said impact force applying mechanism has a rotatable member rotatably supported about a pivot and a magnet for biasing said rotatable member so that one side of said rotatable member contacts said housing in a normal position, whereby the one side imparts an impact force on said housing when said one side is displaced and returns to said normal position.

10. A magnetic disk unit according to claim 1, wherein said impact force applying mechanism includes a box mounted on said housing and a ball contained within said box that is moved to impart an impact force on said housing.

11. A magnetic disk unit, comprising:
    a housing in which is enclosed;
    a magnetic disk medium;
    a spindle and a spindle motor for driving said magnetic medium in rotation;
    a magnetic head for writing and reading information with respect to said magnetic disk medium;
    a slider for supporting said magnetic head; and
    an actuator for positioning said magnetic head;
    an impact force applying mechanism mounted adjacent said housing that applies an impact force to said housing to overcome a sticking phenomenon between said slider and said medium, the mechanism being hermetically isolated from said magnetic disk medium, wherein the mechanism includes:
    a resilient member having opposite ends, one end of which is secured to the housing and the other end of which is positioned close to said housing in a normal position and the resilient member giving an impact on said housing after being displaced from said normal position; and
    an electronic circuit for controlling read and write of data with respect to said magnetic disk medium.

12. A magnetic disk unit according to claim 11, wherein said one end is secured on said housing by a bolt.

13. A magnetic disk unit, comprising:
    a housing in which is enclosed;
    a magnetic disk medium;
    a spindle and a spindle motor for driving said magnetic medium in rotation;
    a magnetic head for writing and reading information with respect to said magnetic disk medium;
    a slider for supporting said magnetic head; and
    an actuator for positioning said magnetic head;
    an impact force applying mechanism mounted adjacent said housing that applies an impact force to said housing to overcome a sticking phenomenon between said slider and said medium, the mechanism being hermetically isolated from said magnetic disk medium, wherein the mechanism includes;
    a box mounted on said housing and a ball contained within said box that is moved to impart said impact force on said housing; and
    an electronic circuit for controlling read and write of data with respect to said magnetic disk medium.

14. A magnetic disk unit, comprising:
    a housing in which is enclosed;
    a magnetic disk medium;
    a spindle and a spindle motor for driving said magnetic medium in rotation;
    a magnetic head for writing and reading information with respect to said magnetic disk medium;
    a slider for supporting said magnetic head; and
    an actuator for positioning said magnetic head;
    an impact force applying mechanism mounted adjacent said housing that applies an impact force to said housing, the mechanism being hermetically isolated from said magnetic disk medium, wherein the mechanism includes:
    means for imparting an impact force on said housing to overcome a sticking phenomenon between said slider end said medium including a rotatable member having one end that contacts said housing in a normal position; and
    bias means for returning said one end to said normal position when displaced therefrom to impart said impact force; and
    an electronic circuit for controlling read and write of data with respect to said magnetic disk medium.

15. A magnetic disk unit, comprising:
    a housing in which is enclosed;

a magnetic disk medium;

a spindle and a spindle motor for driving said magnetic medium in rotation;

a magnetic head for writing and reading information with respect to said magnetic disk medium;

a slider for supporting said magnetic head; and an actuator for positioning said magnetic head;

an impact force applying mechanism mounted adjacent said housing that applies an impact force to said housing to overcome a sticking phenomenon between said slider and said medium, the mechanism being hermetically isolated from said magnetic disk medium, wherein the mechanism includes:

a rotatable member rotatably supported about a pivot; and means for biasing said rotatable member so that one side of said rotatable member contacts said housing in a normal position, whereby the one side imparts an impact force on said housing when said one side is displaced and returns to said normal position; and an electronic circuit for controlling read and write of data with respect to said magnetic disk medium.

16. A magnetic disk unit, comprising:

a housing in which is enclosed:

a magnetic disk medium;

a spindle and a spindle motor for driving said magnetic medium in rotation;

a magnetic head for writing and reading information with respect to said magnetic disk medium;

a slider for supporting said magnetic head; and an actuator for positioning said magnetic head;

an impact force applying mechanism mounted adjacent said housing that applies an impact force to said housing to overcome a sticking phenomenon between said slider and said medium, the mechanism being hermetically isolated from said magnetic disk medium, wherein the mechanism includes:

a rotatable member rotatably supported about a pivot; and a magnet for biasing said rotatable member so than one side of said rotatable member contacts said housing in a normal position;

whereby the one side imparts an impact force on said housing when said one side is displaced and returns to said normal position; and an electronic circuit for controlling read and write of data with respect to said magnetic disk medium.

17. A magnetic disk unit, comprising:

a housing in which is enclosed:

a magnetic disk medium;

a spindle and a spindle motor for driving said magnetic medium in rotation;

a magnetic head for writing and reading information with respect to said magnetic disk medium;

a slider for supporting said magnetic head; and an actuator for positioning said magnetic head;

an impact force applying mechanism mounted adjacent said housing that applies an impact force to said housing without electric energy to overcome a sticking phenomenon between said slider and said medium; and an electronic circuit for controlling read and write of data with respect to said magnetic disk medium.

18. A magnetic disk unit, comprising:

a housing in which is enclosed:

a magnetic disk medium;

a spindle and a spindle motor for driving said magnetic medium in rotation;

a magnetic head for writing and reading information with respect to said magnetic disk medium;

a slider for supporting said magnetic head; and an actuator for positioning said magnetic head;

an impact force applying mechanism mounted adjacent said housing that applies an impact force to said housing without electric energy to overcome a sticking phenomenon between said slider and said medium, the mechanism being hermetically isolated from said magnetic disk medium, and an electronic circuit for controlling read and write of data with respect to said magnetic disk medium.

* * * * *